(12) United States Patent
Hogan et al.

(10) Patent No.: US 11,878,869 B2
(45) Date of Patent: Jan. 23, 2024

(54) SYSTEM AND METHOD FOR CONNECTING RAILS ON A CONVEYOR TRACK

(71) Applicant: ATS CORPORATION, Cambridge (CA)

(72) Inventors: Roger Hogan, Cambridge (CA); Albert Kleinikkink, Cambridge (CA)

(*) Notice: Subject to any disclaimer, the term of this patent is extended or adjusted under 35 U.S.C. 154(b) by 39 days.

(21) Appl. No.: 17/559,474

(22) Filed: Dec. 22, 2021

(65) Prior Publication Data
US 2022/0204278 A1 Jun. 30, 2022

Related U.S. Application Data

(60) Provisional application No. 63/131,526, filed on Dec. 29, 2020.

(51) Int. Cl.
*B65G 21/22* (2006.01)
*B65G 17/38* (2006.01)

(52) U.S. Cl.
CPC ............ *B65G 21/22* (2013.01); *B65G 17/38* (2013.01)

(58) Field of Classification Search
CPC ........ B65G 17/06; B65G 21/22; B65G 17/38; B65G 54/02; E01B 11/26
See application file for complete search history.

(56) References Cited

U.S. PATENT DOCUMENTS

| | | | |
|---|---|---|---|
| 686,696 A | 11/1901 | Andersson | |
| 811,130 A * | 1/1906 | Coverstone | E01B 11/26 238/234 |
| 1,079,825 A | 11/1913 | Bamber | |
| 1,668,407 A * | 5/1928 | Jackich | E01B 11/26 238/235 |
| 1,785,315 A * | 12/1930 | Kennedy | B65G 21/22 104/107 |
| 1,937,075 A | 11/1933 | Walker | |
| 2,950,058 A * | 8/1960 | Watson | E01B 11/26 238/179 |
| 6,343,747 B1 * | 2/2002 | Lin | E01B 11/24 238/151 |

(Continued)

FOREIGN PATENT DOCUMENTS

| | | |
|---|---|---|
| EP | 3580157 A4 | 12/2020 |
| ES | 2569454 A1 | 5/2016 |

(Continued)

OTHER PUBLICATIONS

Extended European Search Report, European Patent Office, on corresponding EP Application No. 21217203.5, dated May 25, 2022.

*Primary Examiner* — Mark A Deuble
(74) *Attorney, Agent, or Firm* — Amarok IP Inc.; Neil W. Henderson

(57) ABSTRACT

A joint system and method for managing alignment tolerances in a track section of a conveyor, the system including: a plurality of track sections, each track section including at least one end to be joined with an adjacent track section and one or more rails on which bearings of moving elements move; and wherein, at the end of each track section, the one or more rails each comprise a finger such that rails from adjacent track sections form an interlaced connection between fingers from each track section and both fingers are angled such that a non-alignment of the rails will not jar a bearing moving over the joint.

20 Claims, 14 Drawing Sheets

(56) References Cited

U.S. PATENT DOCUMENTS

| | | | |
|---|---|---|---|
| 9,428,347 B2* | 8/2016 | Kleinikkink | B65G 21/2009 |
| 2014/0076980 A1 | 3/2014 | Urmson, Jr. et al. | |
| 2018/0099822 A1* | 4/2018 | Kleinikkink | B65G 54/02 |
| 2023/0085908 A1* | 3/2023 | Gardner | G01L 5/042 |
| | | | 702/42 |

FOREIGN PATENT DOCUMENTS

| | | |
|---|---|---|
| KR | 1020070034675 A | 3/2007 |
| WO | 2018145214 A1 | 8/2018 |

* cited by examiner

SYSTEM AND METHOD FOR CONNECTING RAILS ON A CONVEYOR TRACK

FIELD

The present disclosure relates generally to a system and method for connecting rails on a conveyor track and, more particularly, to a system and a method for connecting rails of conveyor track sections such that the rails provide a smoother transition at joints without requiring precise manufacturing and alignment tolerances.

BACKGROUND

In conventional conveyor systems, a moving element is controlled to move along a track, typically via bearings that are provided on the moving element or on the track and may include rails or the like for guiding the moving element. In order to make a conveyor system easier to construct, the track is often formed in sections/modules and the sections are then attached together to form a longer track. The alignment of the track sections, and in particular, the rails that the moving element will travel on, or along, can be important to reduce or eliminate jarring or noise as a moving element/bearings move along the track. The alignment can also be important in reducing/preventing wear on the bearings and/or wheels and track that may be caused by misalignment or unsmooth transitions between track sections.

A linear motor conveyor system is one in which a moving element is moved by electromotive force. For example, the moving element may include a magnet and the track may include an electromagnetic field generator. The moving element is placed on the track such that the magnet is acted on by the electromagnetic field in order to generate an electromotive force and move the moving element along the track.

In linear motor conveyor systems, forces, including forces causing acceleration, on the moving element can be high in order to move or stop the moving element quickly in order to increase production speeds. When the moving element is moving quickly along a track, it is even more important for adjacent track sections to be connected in a way that maintains alignment between the bearing surfaces of the track sections. In particular, it is can also be important to allow for tolerance errors introduced during manufacturing of the track sections in order to ensure a smooth ride.

Conveyor systems and in particular, linear motor conveyor systems are becoming more popular on assembly lines and, as such, are being produced in larger quantities. In some cases, it can be easier to make parts for the conveyor systems if there are reduced tolerances in the making of the parts, such as track sections. However, this can lead to issues with maintenance and control if moving elements/bearings encounter a misalignment when traversing from one track section to another. In particular, if there is misalignment, the moving element may be bumped or otherwise jarred during the travel.

Similar issues apply with regard to various kinds of conveyors, and if reduced tolerances (manufacturing, installation, or the like) related to alignment of track sections can be used, there will generally be a reduction in cost of manufacturing, installation, maintenance, and the like.

As such, there is a need for an improved system and method for connecting conveyor track sections and, in particular, rails of the conveyor track sections.

SUMMARY

According to one aspect herein, there is provided a joint system for managing alignment tolerances in a track section of a conveyor, the system including: a plurality of track sections, each track section including at least one end to be joined with an adjacent track section and one or more rails on which bearings of moving elements move; and wherein, at the end of each track section, the one or more rails each comprise a finger such that rails from adjacent track sections form an interlaced connection between fingers from each track section and both fingers are angled such that a non-alignment of the rails within a predetermined alignment tolerance will not jar a bearing moving over the joint.

In a particular case, the fingers are angled at an angle sufficient to allow for the predetermined alignment tolerance.

In another particular case, the fingers may be configured such that, when adjacent track sections are assembled, primary running surfaces of the bearings run along the fingers from the adjacent track sections.

In another particular case, the size and angle of the fingers may be determined according to a predetermined speed, for example, a maximum speed, of the conveyor and the bearing diameter and/or width.

In another particular case, at least one of the fingers may include a plurality of fingers each configured to interlace with a corresponding finger or plurality of fingers on an adjacent track section.

In another particular case, the one or more rails may include a v-shaped rail and the v-shaped rail is configured such that the angle for each of the fingers is determined in three dimensions.

In another particular case, the fingers may be angled at an angle that is provided to a portion of at least one finger.

In another particular case, the fingers may be angled at an angle that is non-linear and includes a curve.

According to another aspect herein, there is provided a joint system for managing alignment tolerances in a track section of a conveyor, the system including: a plurality of track sections, each track section including at least one end to be joined with an adjacent track section and one or more rails on which bearings of moving elements move; and wherein, at the end of each track section, the rails comprise a tongue and groove connector such that rails from adjacent track sections form an interlaced connection with a tongue on one track section fitting into a groove on an adjacent track section, and wherein at least a running surface where the bearings contact the tongue and groove is each configured with a slope downward towards the other such that a non-alignment of the rails within a predetermined alignment tolerance will not impact movement of a bearing surface over the joint.

In a particular case, the tongue and groove connectors may be sloped to allow for the predetermined alignment tolerance. For example, the alignment tolerance may be in the range of 100 microns or less, 50 microns or less, 40 microns or less, or 25 microns or less.

In another particular case, the slope of the tongue and groove connector may be related to the alignment tolerance, the speed of the conveyor and the diameter of the bearings.

In another particular case, the tongue may include a plurality of tongues and the groove may include a plurality of grooves each configured to interlace with corresponding plurality of tongues or grooves on an adjacent track section.

In another particular case, the one or more rails may include a v-shaped rail and the v-shaped rail may be configured such that the slope for the tongue and groove connector is determined in three dimensions.

In another particular case, the slope may be provided to a portion of the tongue or groove.

In another particular case, the slope may be non-linear.

According to another aspect herein, there is provided a method for manufacturing track sections of a conveyor having an alignment tolerance, the method including: forming a finger at an end of each track section; angling each finger such that, when adjacent track sections are assembled, primary running surfaces of the bearings run along the fingers from the adjacent track sections such that a non-alignment of the rails within a predetermined alignment tolerance will not jar movement of a bearing over the joint.

According to another aspect herein, there is provided a joint system for managing alignment tolerances in a track section of a conveyor, the system including: a plurality of track sections, each track section including at least one end to be joined with an adjacent track section and one or more rails on which bearings of moving elements move; and wherein, at the end of each track section, the one or more rails comprise a finger or split rail portion such that rails from adjacent track sections form an interlaced connection between finger and split rail portion and both the finger and split rail portion are angled such that a non-alignment of the rails within a predetermined alignment tolerance will not impact movement of a bearing over the joint.

In another particular case, the finger and split rail portion may be angled to allow for the predetermined alignment tolerance.

In another particular case, the finger and split rail portion may be configured such that, when adjacent track sections are assembled, primary running surfaces of the bearings run along the finger and split rail portions from the adjacent track sections.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides an improved track section joint system and method of manufacturing rail joints. Generally, it is intended that the conveyor track sections (sometimes referred to as track segments) can connect via joints between the sections. As moving elements travel between track sections, the track section joint system detailed herein is intended to provide a smooth transition for a wheel or bearing of the moving element, even where there may be some misalignment between the sections. The track section joint system is intended to include at least one angled or tapered connection, which is intended to allow the wheel to be supported by both track sections simultaneously. This simultaneous support is intended to provide for a smoother transition compared to a misalignment in a conventional joint system.

In order to make a conveyor system and the accompanying track sections easier to manufacture and reduce the maintenance required on the elements within the conveyor system, the track section joint should allow for smooth transition over the joint. It is intended that there will be more forgiveness for misalignment or alignment tolerances with an angled joint system In the following description, the examples relate to a linear motor conveyor system but the same or similar joint connector and method can generally be used with other conveyor systems that would benefit from alignment of tracks and easier mechanical assembly.

Figure 1:
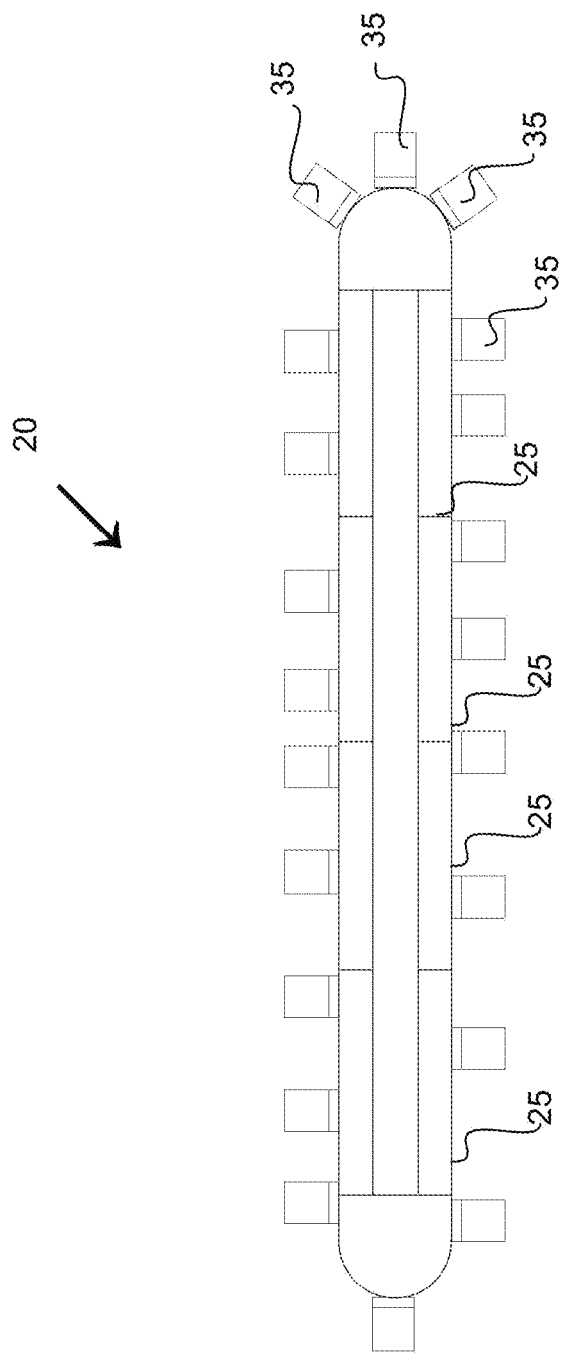
FIG. 1 shows a schematic drawing of an embodiment of a conveyor system that includes a track, made up of track section, and moving elements.

FIG. 1 shows a schematic diagram of an example conveyor system 20. The conveyor system 20 includes one or more track sections 25 defining a track. A plurality of moving elements 35 are provided to the track and move around on the linear motor conveyor system 20. In a manufacturing environment, the moving elements 35 are intended to travel between workstations (not shown) and may support a pallet or product (not shown) that is to be operated on automatically by, for example, a robot, while moving or at a workstation or may travel to a workstation or other work area intended for manual operations. Through the operation of the conveyor system 20, various operations are performed to provide for the assembly of a product. In this disclosure, the terms "moving element" and "pallet" may sometimes be used interchangeably, depending on the context.

Figure 2:
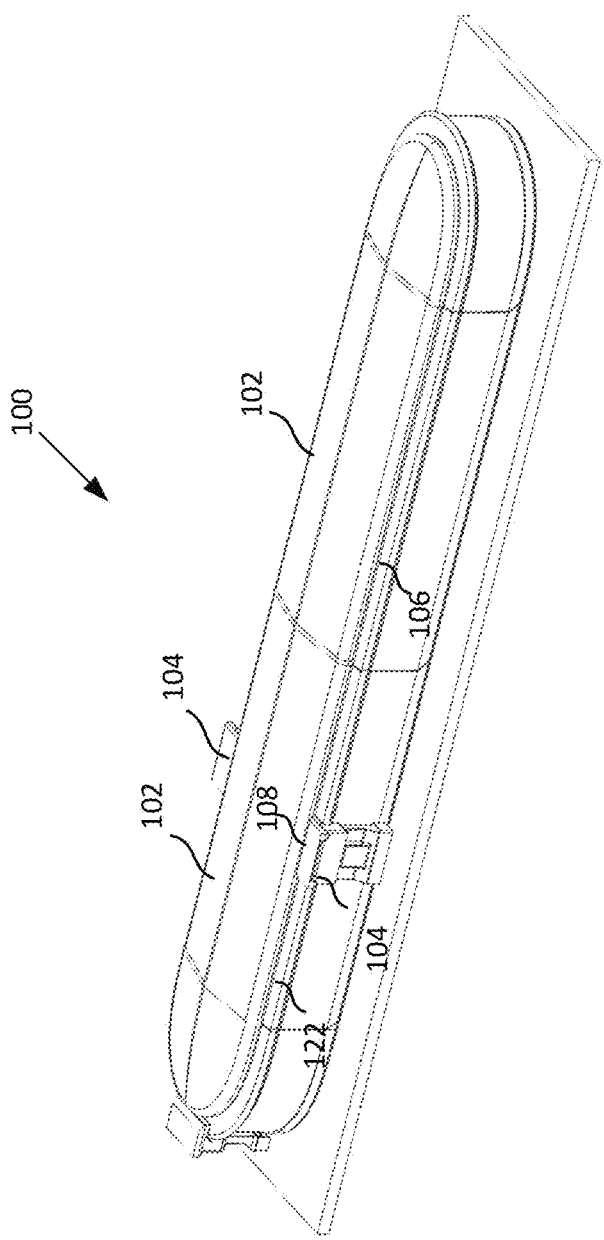
FIG. 2 shows a perspective view of an embodiment of a conveyor system that includes a track, made up of track section, and moving elements.

FIG. 2 illustrates a perspective view of another example linear motor conveyor system 100 having one or more track sections 102 defining a track 106, and one or more moving elements 104 which are configured to ride, move or travel along the track 106. In FIG. 2, there are four straight track sections 102, and two corner track sections, and three moving elements 104. However, it will be understood that the modular nature of the track sections allow for various sizes and shapes of conveyors and any appropriate number of moving elements. Some of the principles of operation of a similar track section are described in more detail in, for example, U.S. Pat. No. 8,397,896 to Kleinikkink et al., which is hereby incorporated herein by reference.

As noted, the conveyor system 100 may include a plurality of track sections 102, which are mechanically self-contained and separable from one another so as to be modular in nature. In this embodiment, the track sections 102 are mounted on a support (not shown) so as to align and abut one another in order to form a longer track. In order to be modular, each track section 102 may house electronic circuitry for powering and controlling the track section 102.

In a linear motor conveyor system 100, the track 106 may produce a magnetic force for moving the moving element 104 along the track 106. The magnetic force can also capture, support or hold the moving element 104 on the track 106. The magnetic force is partly generated by the interaction of the magnetic flux created by embedded coils of the track 106 and magnetic elements of the moving element 104.

Figure 3:
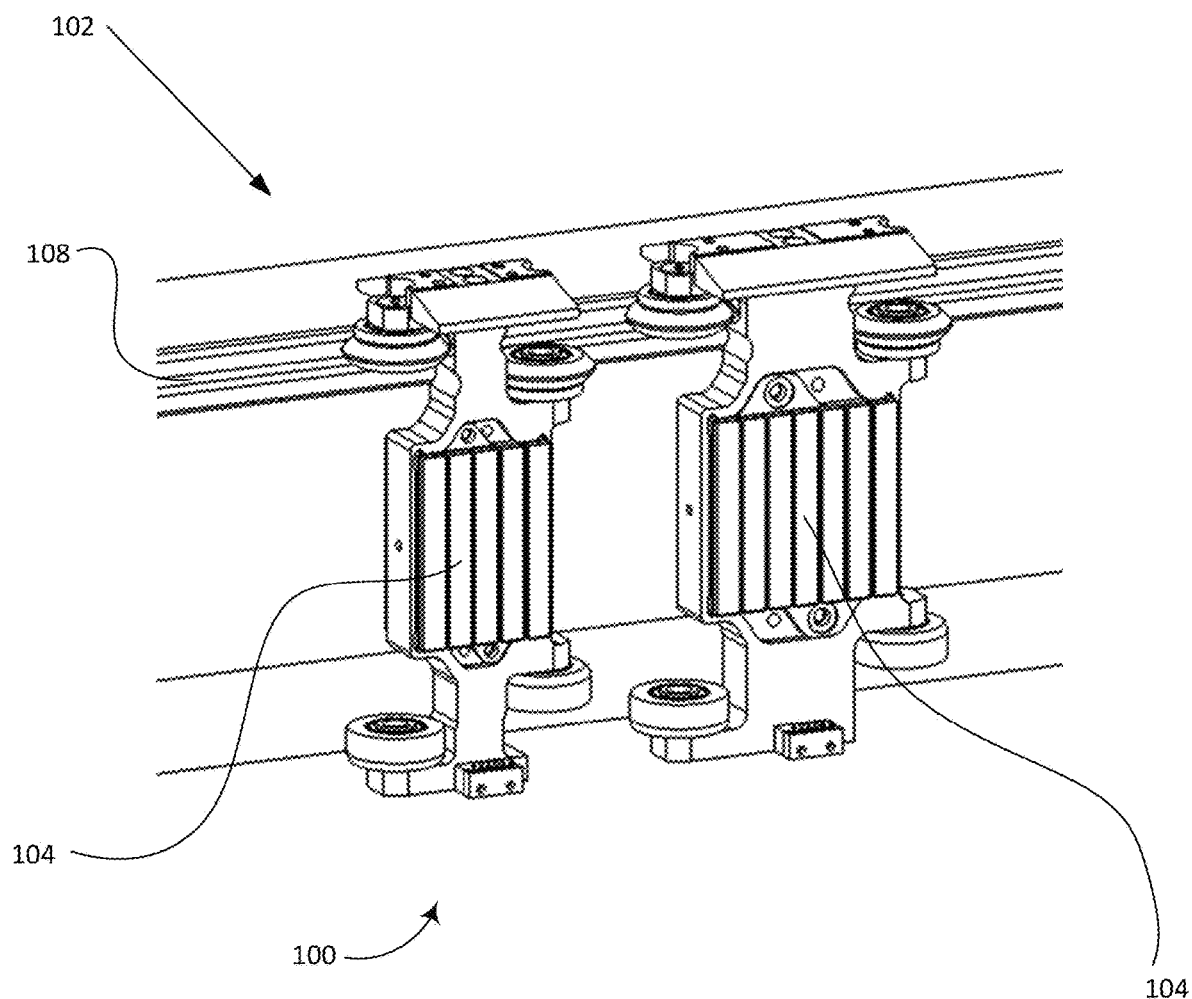
FIG. 3 shows a view of an embodiment of a track section having two moving elements on it.
Figure 4:
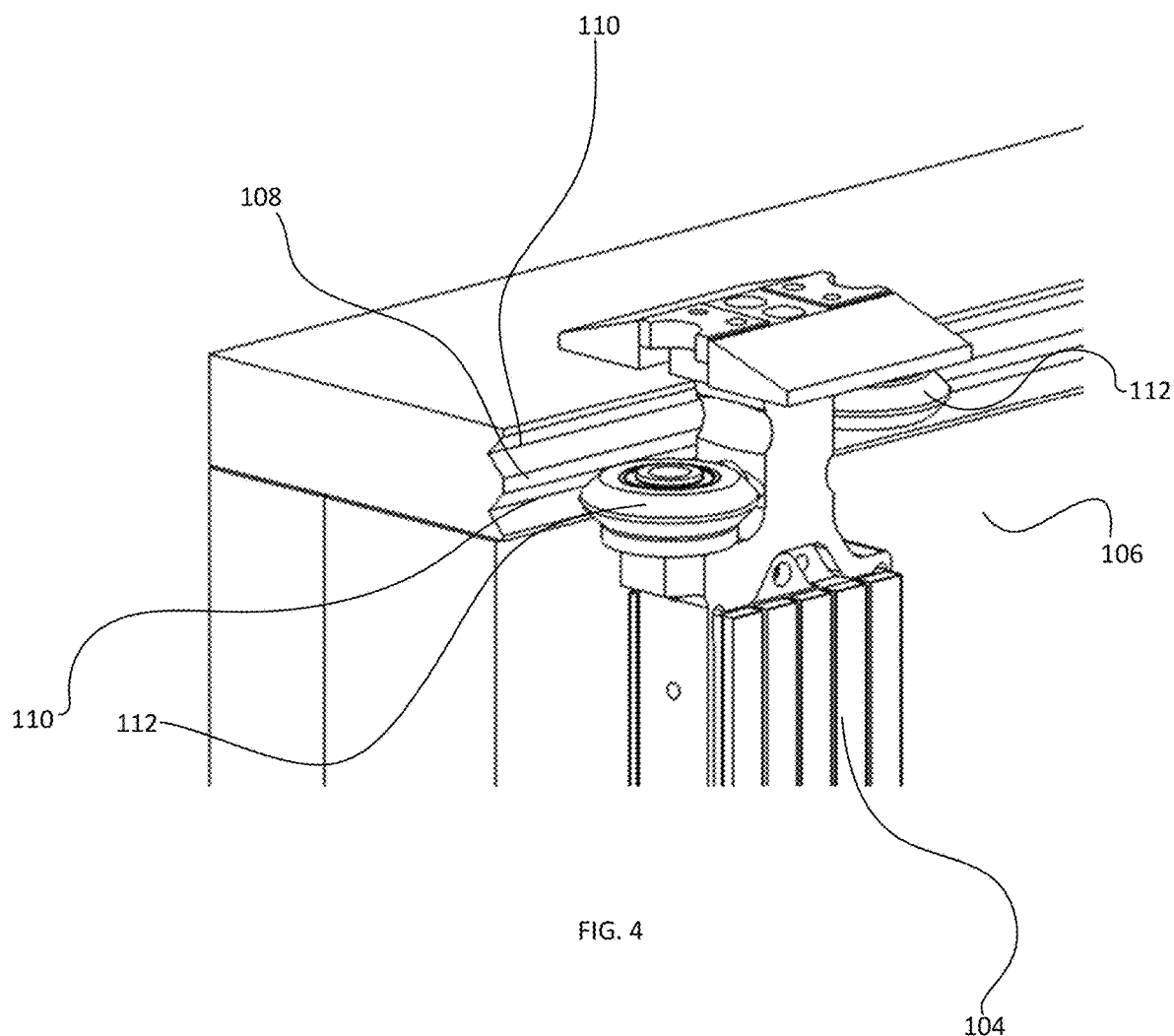
FIG. 4 shows an embodiment of an end of a conventional track section.

FIG. 3 illustrates an embodiment of a linear motor conveyor system 100 that includes a track section 102 and two moving elements 104. FIG. 4 illustrates an end of a conventional track section 102, showing the shape of a guide rail 108. The track 102 may be made up of track sections 102, joined end-to-end, with each guide rail 108 of each track section 102 aligned with the guide rail 108 of adjacent track sections 102. In the embodiment shown in FIG. 4, the track section 102 includes a guide rail 108 located in an upper portion of track section 102, and the guide rail 108 has dual shaped grooves 110. The moving elements 104 include bearings 112 that are correspondingly shaped in order to run along the guide rail 108, each bearing 112 running inside a respective shaped groove 110. The bearings 112 may be offset and such that for a moving element 104 having two shaped bearings 112, each shaped bearing may run inside a separate respective shaped groove 110.

In some embodiments, the track section 102 may produce a magnetic force for moving the moving element 104 along the track 102. The magnetic force can also capture/hold the moving element 104 on the track 102. In some cases, the magnetic force is created by the interaction of the magnetic flux created by coils (not shown) embedded in/under the track section and magnetic elements (not shown) of the moving element 104. The magnetic force can be thought of as having a motive force component for directing movement of the moving element 104 along a direction of travel on the track 102, and a capturing force component to laterally hold the moving element 104 on the track 102 and in spaced relation to the track surface. In at least some conveyor systems, the motive force and the capturing force can be provided by the same magnetic flux.

Generally speaking, the track sections 102 will be mounted on a support structure (not shown in FIGS. 3 and 4) so as to align and abut one another in order to form the track 106. In order to be modular, each track section 102 may house self-contained electronic circuitry for powering and controlling the track section. Each track section may be controlled by a control system.

Embodiments of the track joint system disclosed herein are intended to provide for tapered, sloped or angled guide rail connections to create a smooth transition for a bearing of a moving element when transitioning from one rail to another. The angled guide rail connections are intended to provide for smooth travel, in either direction, even when there is some misalignment between the rails of the track sections (due to, for example, manufacturing or alignment tolerances). In general, the ends of the rails are cooperatively configured so that both guide rails (i.e. on each side of a joint) can support the bearing simultaneously for a predetermined distance. In particular, a running surface of the guide rail overlaps in this split area. Beyond this overlap, the guide rail is intended to be angled, sloped, curved or taper inward. When the two guide rails of the track sections are aligned, the bearing is intended to transition from one primary running surface to the other without any bump or jarring. When there is some level of misalignment, the bearing is intended to make contact with the gentle slope of the tapered portion of the rail, rather than impacting on an edge, which is intended to reduce or eliminate any bump or jarring that might otherwise occur during the transition from one track section to another.

Figure 5:
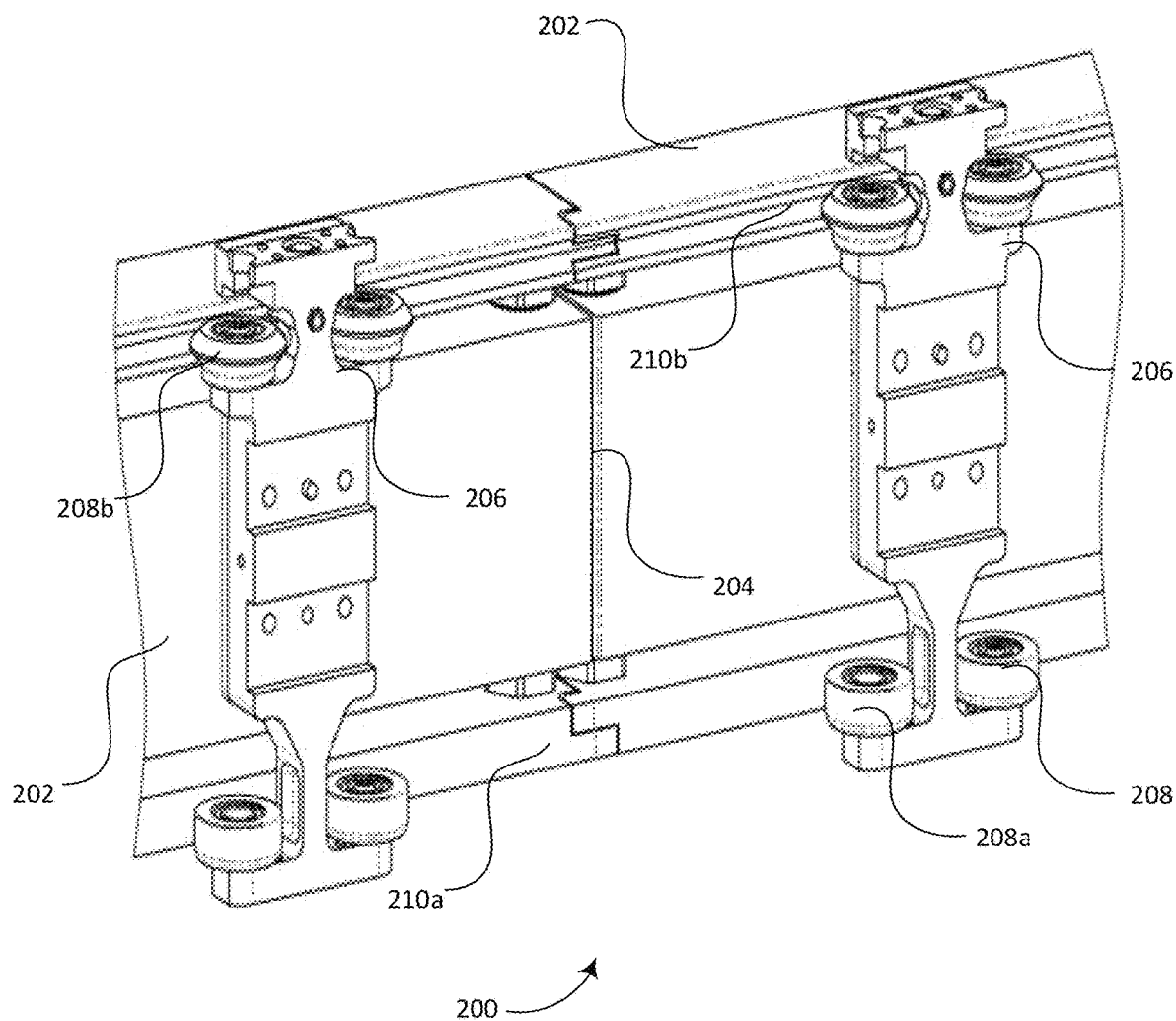
FIG. 5 shows a view of an embodiment of a connection between two track sections.

FIG. 5 shows an embodiment of a joint system for connecting track sections and in particular, rails of track sections. As shown in FIG. 5, a linear motor conveyor system 200 includes a plurality of track sections 202, where track sections meet at a joint 204. As a moving element 206 moves from a first track section to a second track section, the moving element 206 crosses the joint 204. The moving element 206 includes at least one bearing 208, and generally includes a plurality of bearings.

As shown in FIG. 5, a track section may include one or more guide rails 210a and 210b. In the illustrated embodiment of the linear motor conveyor system, each track section includes a bottom flat guide rail 210a and a top shaped guide rail 210b. It will be understood that each bearing 208 is intended to be correspondingly shaped to the corresponding guide rail. For example, a flat bearing 208a runs along a flat guide rail 210a while a shaped bearing 208b runs along a shaped guide rail 210b. As the bearings run along the rails, if the joint is not aligned, there can be a bump or jolt to the bearings.

Figure 6:
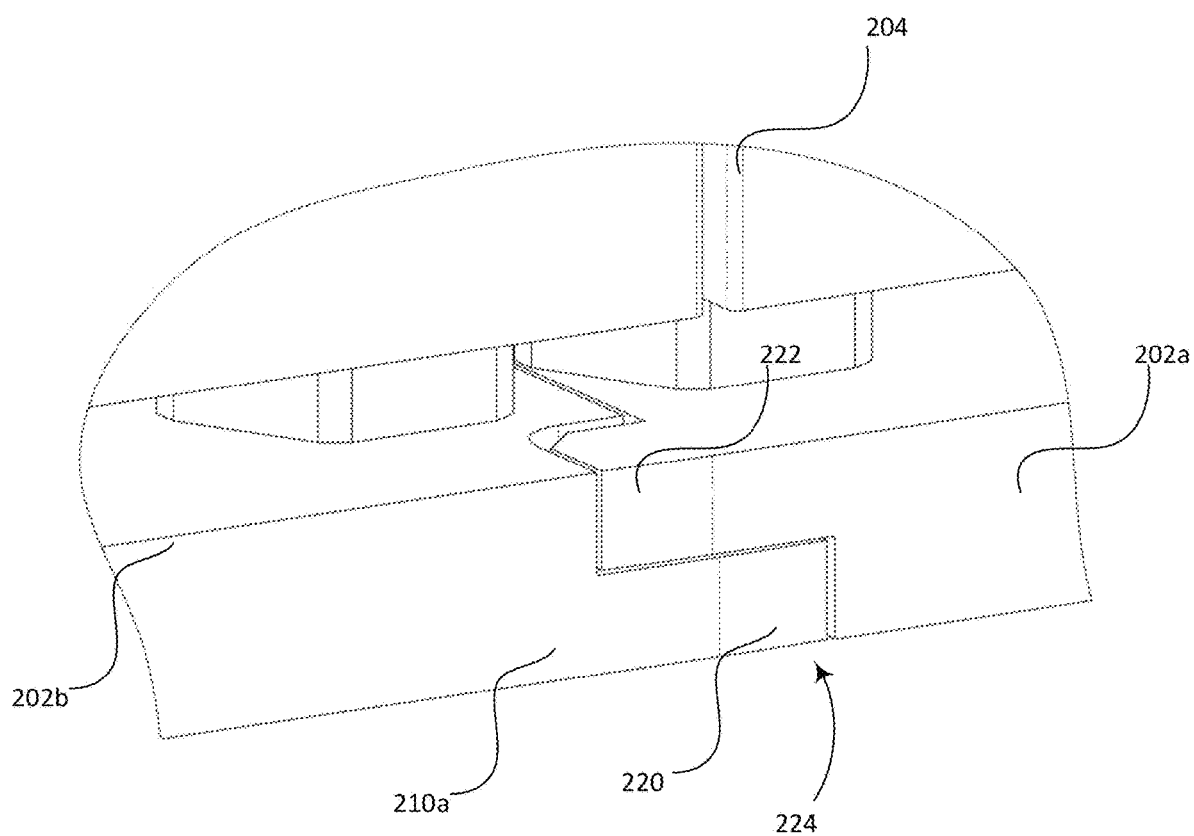
FIG. 6 shows a close up view of an embodiment of a connection between two track sections related to flat rails.

FIG. 6 illustrates a joint system for connecting a track section configured for a flat guide rail 210a according to an embodiment. The joint 204 is intended to be a cooperative connection between each track section. A first track section 202a includes at least one protrusion or finger 220, which is shaped to be received by or interact with at least one protrusion or finger 222 at a receiving end 224 of a second adjacent track section 202b. The at least one protrusion 220 is intended to be received such that the track sections are joined at a generally horizontal surface.

In some cases, the position of the edge between the protrusion 220 and the protrusion 222 is intended to be aligned with the approximate center of at least one bearing 208 of the moving element 206. As the moving element 206 transitions between the first track section 202a and the second track section 202b, the at least one bearing is intended to travel over the at least one protrusion 220 and the receiving end 224. As each of the at least one protrusions 220, 222 are intended to be angled or sloped away from the axis of the guide rail, it is intended that at least a portion of the bearing is in contact with at least the protrusion 220, 222 from either the first or second track section at all times during the travel.

For a moving element travelling from the first track section to a second adjacent track section, the bearing of the moving element will be supported by the at least one protrusion 220 until the angled receiving end 222 of the second track section 202b rises to a level to be flush with the protrusion. At approximately the same vertical, the protrusion 220 of the first track section 202a will begin to be angled inward and cease supporting the bearing as it is continues to be supported by the receiving end of the guide rail of the second track section 202b. It will be understood that for a moving element travelling from the second track section to the first track section, the bearing will be supported by the receiving end until the angle of the protrusion of the first track section is level with the receiving end. The at least one protrusion 222 of the receiving end 224 is angled away from the guide rail 210a and the protrusion 220 of the first track section 202a continues to support the bearing.

Figure 7:
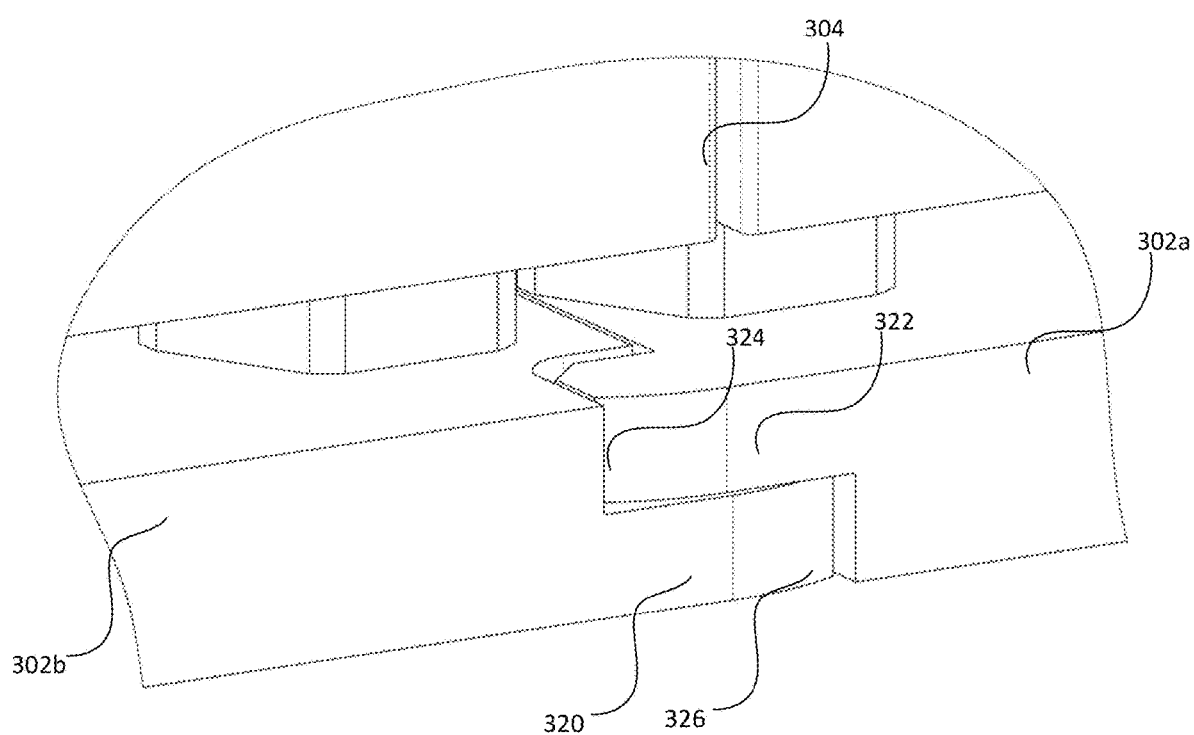
FIG. 7 illustrates an overstated view of the connection between two track sections of FIG. 6.

FIG. 7 illustrates an overstated or exaggerated view of an embodiment of the joint system similar to that of FIG. 6. A first track section 302a is connected with a second track section 302b via a joint 304. The first track section 302a includes at least one protrusion 320 which includes a first angled section 326 which is tapered or curved inwards of the track. The first angled section 326 is intended to by shaped radially inward. Further, second track section includes a receiving end 322 with one or more protrusions each of which includes a second angled section 324 which is also angled or curved inwards toward the track.

The first and second angled sections are intended to accommodate greater manufacturing tolerances or imprecisions, to the extent that at least one portion of the bearing is in contact with at least one of the protrusions as the moving element traverses the joint. Conventionally, when the ends of the guide rails on each track section were cut flush at 90 degrees, then any imprecisions/inaccuracies would result in a bump as the bearing travelled over the joint. In the system disclosed herein, the protrusions of the guide rails have a surface that is angled or curved inward. As such, it is intended that there is less chance of having a bump, or if a bump occurred, the bump would not be realized insofar as the height of the bump (or the tolerance) was less than the slope of the taper times the length of the taper. The bearing is intended to straddle both sides of the joint so that the bearing does not encounter a bump, nor does the bearing lose contact with the guide rail during travel over the joint. In some cases, the horizontal split of the protrusions is intended to be at approximately the middle of the bearing.

The system for a track section joint may include protrusions that are angled throughout the protrusion or angled only in predetermined section of the protrusion. According to some embodiments, the break between a flat section of the protrusion and the angled section is intended to define an overlap with respect to the adjacent track sections. The overlap section can provide a continuity as the bearing of the moving element transitions from the first track section to the adjacent track section.

Figure 8:
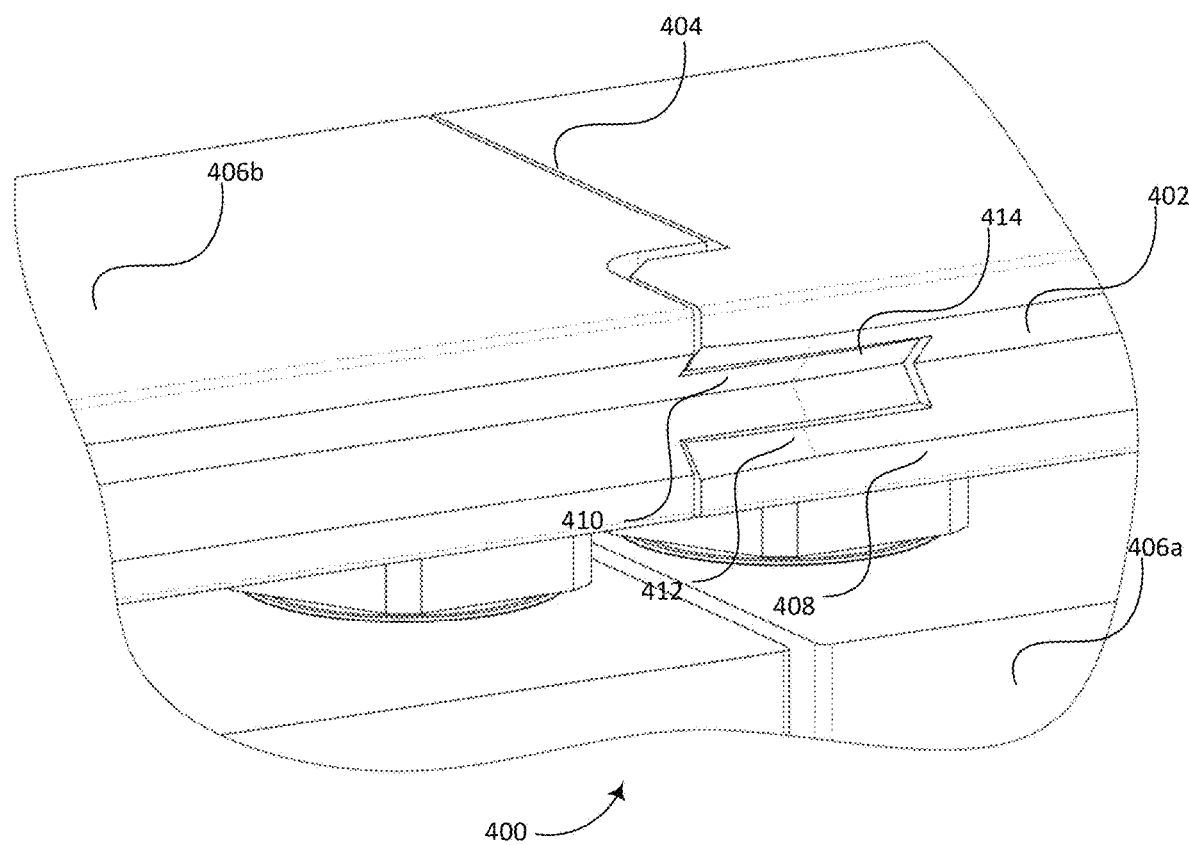
FIG. 8 shows a close up view of an embodiment of a connection between two track sections related to shaped rails.

FIG. 8 illustrates an example embodiment of a system 400 for a track section joint 404 for a shaped guide rail 402. The shaped guide rail 402 is intended to contact a bearing on more than one contact surface. A first track section 406a is intended to include at least one protrusion 408 per shaped groove, which is cooperatively received by at least one protrusion 410 per groove on a second track section 406b. The at least one protrusion 408, 410 on each of the first and second track sections 406a, 406b each include an angled section 412, 414 and each angled section 412, 414 is intended to angle or taper inward. In some cases, the angle or taper of the protrusion is determined in three dimensions, such that as the bearing travels on the shaped guide rail and over the joint 404, at least a portion of the bearing remains in contact with at least one guide rail section in one or more planes. Generally, is intended that each surface tapers away in a direction normal to the surface. In some cases, the taper may be greater in one direction than another if it is expected that a misalignment may be greater in one direction than another.

Figure 9:
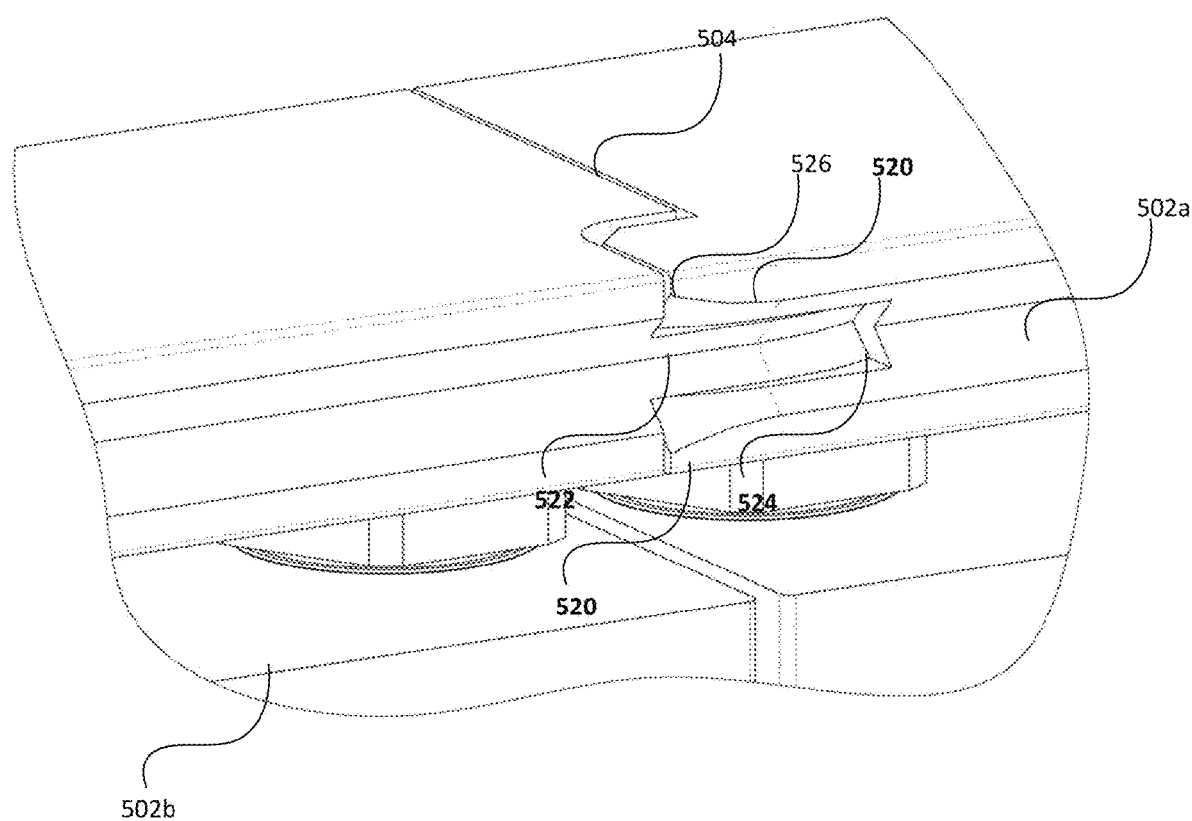
FIG. 9 illustrates an overstated view of the connection between two track sections of FIG. 8.

FIG. 9 illustrates an overstated or exaggerated view of an embodiment of the joint system similar to that of FIG. 8. A first track section 502a is connected with a second track section 502b via a joint 504. The first track section 502a includes at least one protrusion 520 which includes a first angled section 526 which is tapered or curved inwards of the track in at least one direction. In most cases, where the track is a shaped track, the first track section may generally include at least two protrusions 520 in order to provide better support and a more stable attachment at the joint. Further, second track section includes a receiving end 522 with one or more protrusions each of which includes a second angled section 524 which is also angled or curved inwards toward the track. It will be understood that the system may be configured in an opposite orientation with the second track section including at least two protrusions and the first track section including a single protrusion.

Figure 10:
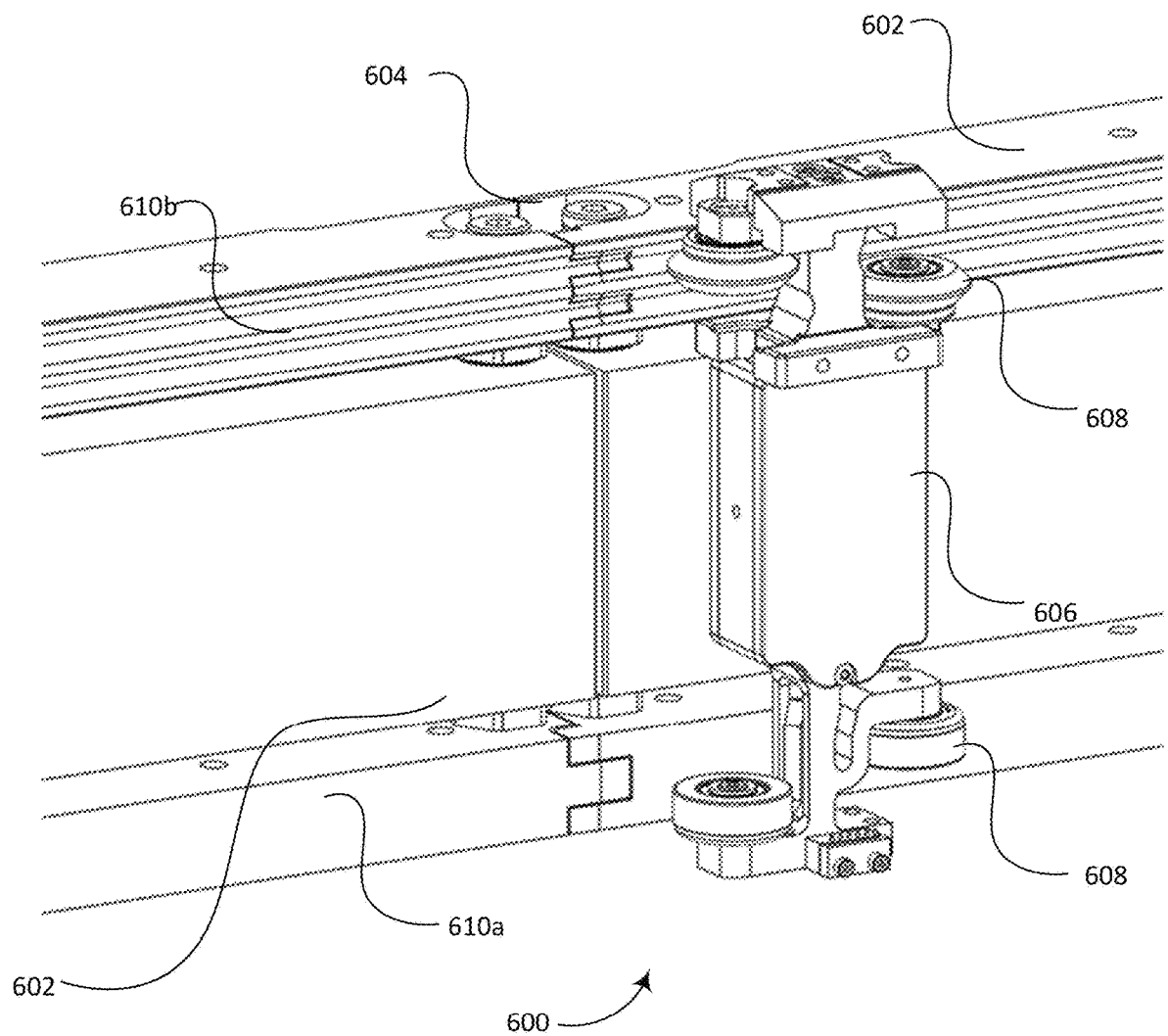
FIG. 10 shows a view of an embodiment of a connection between two track sections.

FIG. 10 illustrates another example embodiment of a conveyor system 600. A track section 602 may include one or more guide rails 610, connected via a joint 604. In the illustrated embodiment of the linear motor conveyor system, each track section includes a bottom flat guide rail 610a and a top shaped guide rail 610b. It will be understood that the at least one bearing 608 is intended to be correspondingly shaped to the guide rail.

Frequently, moving elements include a plurality of bearings. As illustrated, moving element 606 includes bearings 608 that are vertically offset. In these cases, a system for a track joint connection may include more than one protrusion on both the first track section and the second track section. In some cases, the number of protrusions may be determined by the number of vertically offset bearings on the moving element.

Figure 11:
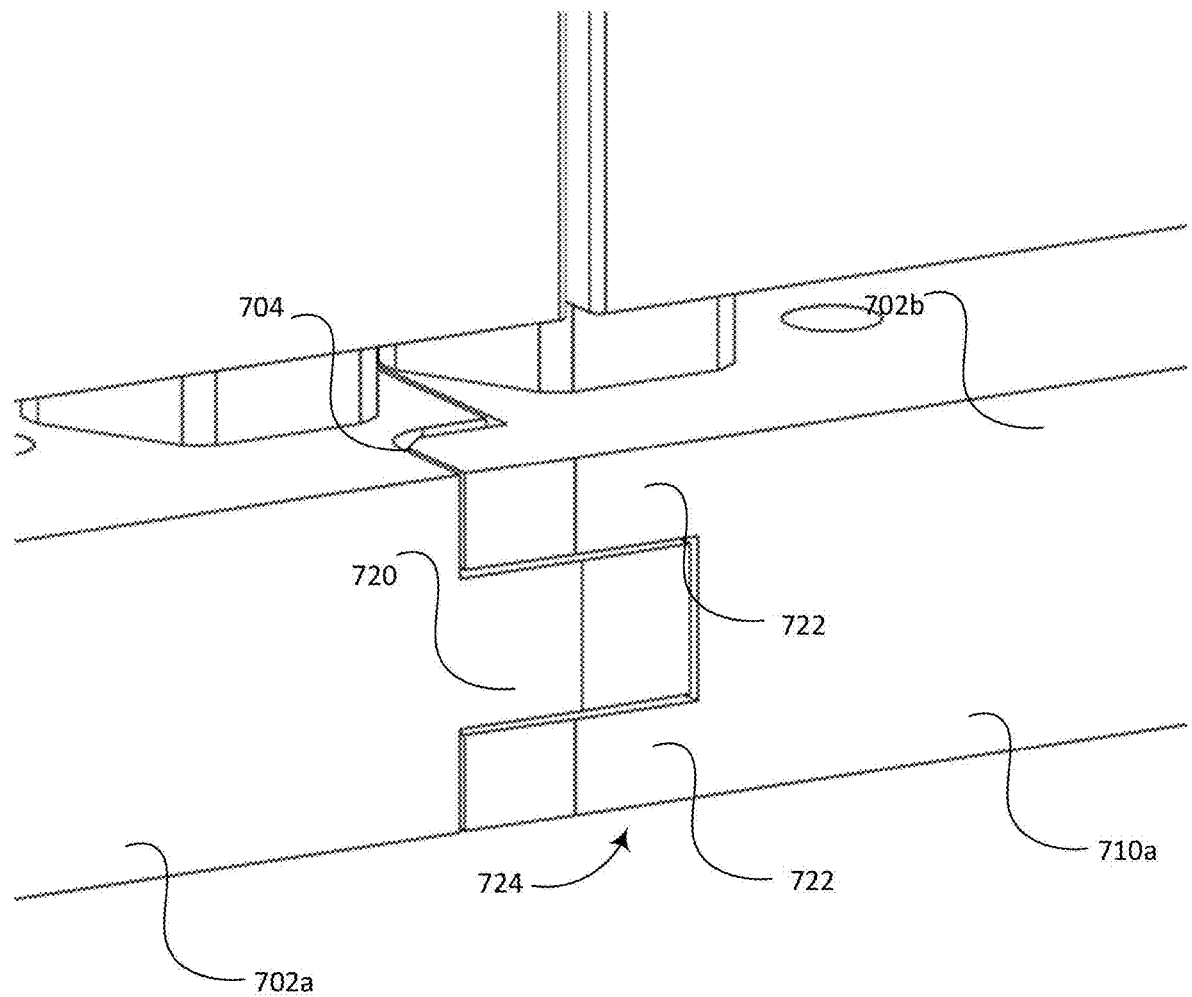
FIG. 11 shows a close up view of an embodiment of a connection between two track sections related to flat rails.

FIG. 11 illustrates a joint system for connecting a track section configured for a flat guide rail 710a according to an embodiment. The joint 704 is intended to be a cooperative connection between each track section. A first track section 702a includes at least one protrusion or finger 720, which is shaped to be received by at least one protrusion or finger 722 at a receiving end 724 of a second adjacent track section 702b. The at least one protrusion 720 is intended to be received such that the track sections are joined at a generally horizontal surface.

In some cases, the position of the edge between the protrusion 720 and the protrusion 722 is intended to be aligned with the approximate center of at least one bearing 708 of the moving element 706. As the moving element 606 transitions between the first track section 702a and the second track section 702b, the at least one bearing is intended travel over the at least one protrusion 720 and the receiving end 724. As each of the at least one protrusions 720, 722 are intended to be angled or sloped away from the axis of the guide rail, it is intended that at least a portion of the bearing is in contact with at least the protrusion 720, 720 from either the first or second track section at all times during the travel.

For a moving element travelling from the first track section to a second adjacent track section, the bearing of the moving element will be supported by the at least one protrusion 720 until the angled receiving end 722 of the second track section 702b rises to a level to be flush with the protrusion. At approximately the same vertical, the protrusion 720 of the first track section 702a will begin to be angled inward and cease supporting the bearing as it is continues to be supported by the receiving end of the guide rail of the second track section 702b. It will be understood that for a moving element travelling from the second track section to the first track section, the bearing will be supported by the receiving end until the angle of the protrusion of the first track section is level with the receiving end. The at least one protrusion 722 of the receiving end 724 is angled away from the guide rail 710a and the protrusion 720 of the first track section 702*a* continues to support the bearing. It will be understood that a longer protrusion may provide for a more gently taper or slope to the protrusion. In some cases, the taper may be linear. In other cases, the taper may be curved.

Figure 12:
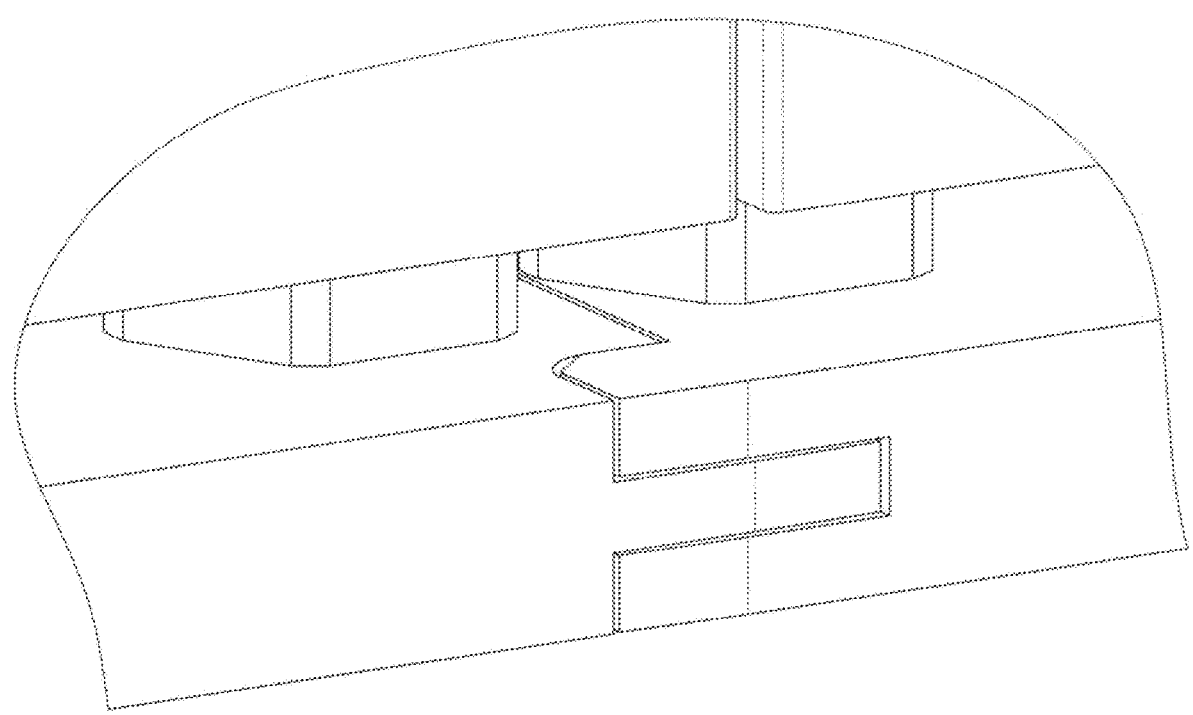
FIG. 12 shows a close up view of an embodiment of a connection between two track sections related to flat rails.

FIG. 12 illustrates an embodiment of the joint system similar to that of FIG. 11 but having longer fingers such that the fingers can have a differing slope than those of FIG. 11. It will be understood that the slope can be linear, curved, partial or in various other configurations.

Figure 13:
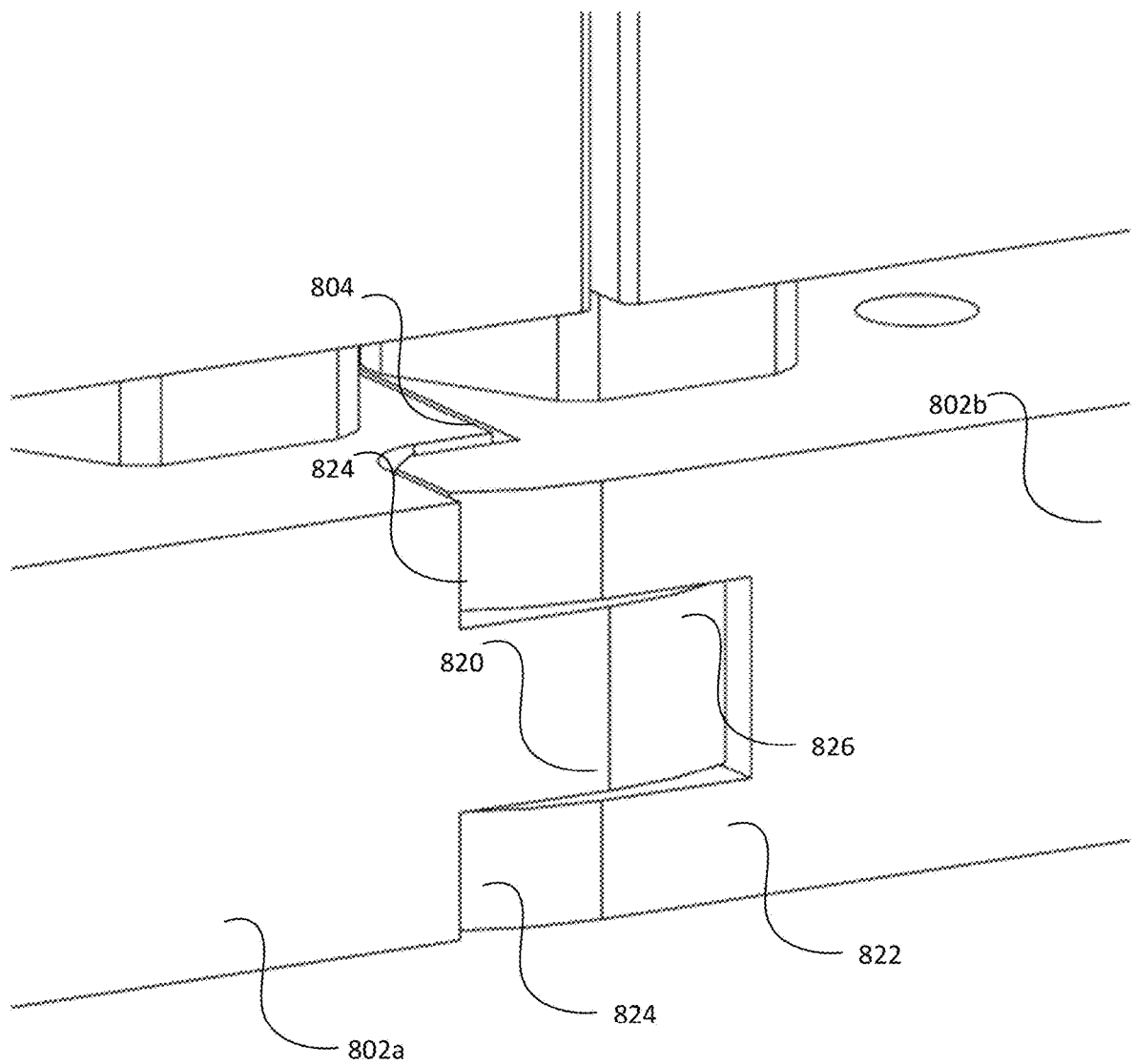
FIG. 13 illustrates an overstated via of the connection between two track sections of FIG. 11.

FIG. 13 illustrates an overstated or exaggerated view of an embodiment of the joint system similar to that of FIG. 11. A first track section 802*a* is connected with a second track section 802*b* via a joint 804. The first track section 802*a* includes at least one protrusion 820 which includes a first angled section 826 which is tapered or curved inwards of the track. The first angled section 826 is intended to be shaped radially inward. Further, the second track section includes a receiving end 822 with one or more protrusions each of which includes a second angled section 824 which is also angled or curved inwards toward the track.

The first and second angled sections are intended to accommodate greater manufacturing tolerances or imprecisions, to the extent that at least one portion of the bearing is in contact with at least one of the protrusions as the moving element traverses the joint. Conventionally, when the ends of the guide rails on each track section were cut flush at 90 degrees, then any imprecisions/inaccuracies would result in a bump as the bearing travelled over the joint. In the system disclosed herein, the protrusions of the guide rails have a surface that is angled or curved inward. As such, it is intended that there is less chance of having a bump, or if a bump occurred, the bump would not be realized insofar as the height of the bump (or the tolerance) was less than the slope of the taper times the length of the taper. The bearing is intended to straddle both sides of the joint so that the bearing does not encounter a bump, nor does the bearing lose contact with the guide rail during travel over the joint.

The system for a track section joint may include protrusions that are angled throughout the protrusion or angled only in predetermined section of the protrusion. According to some embodiments, the break between a flat section of the protrusion and the angled section is intended to define an overlap with respect to the adjacent track sections. The overlap section can provide a continuity as the bearing of the moving element transitions from the first track section to the adjacent track section.

Frequently, moving elements include a plurality of bearings. As previously illustrated, moving element 606 includes bearings 608 that are vertically offset. In these cases, more than one protrusion may be included on both the first track section and the second track section. In some cases, the number of protrusions may be determined by the number of vertically offset bearings on the moving element.

Figure 14:
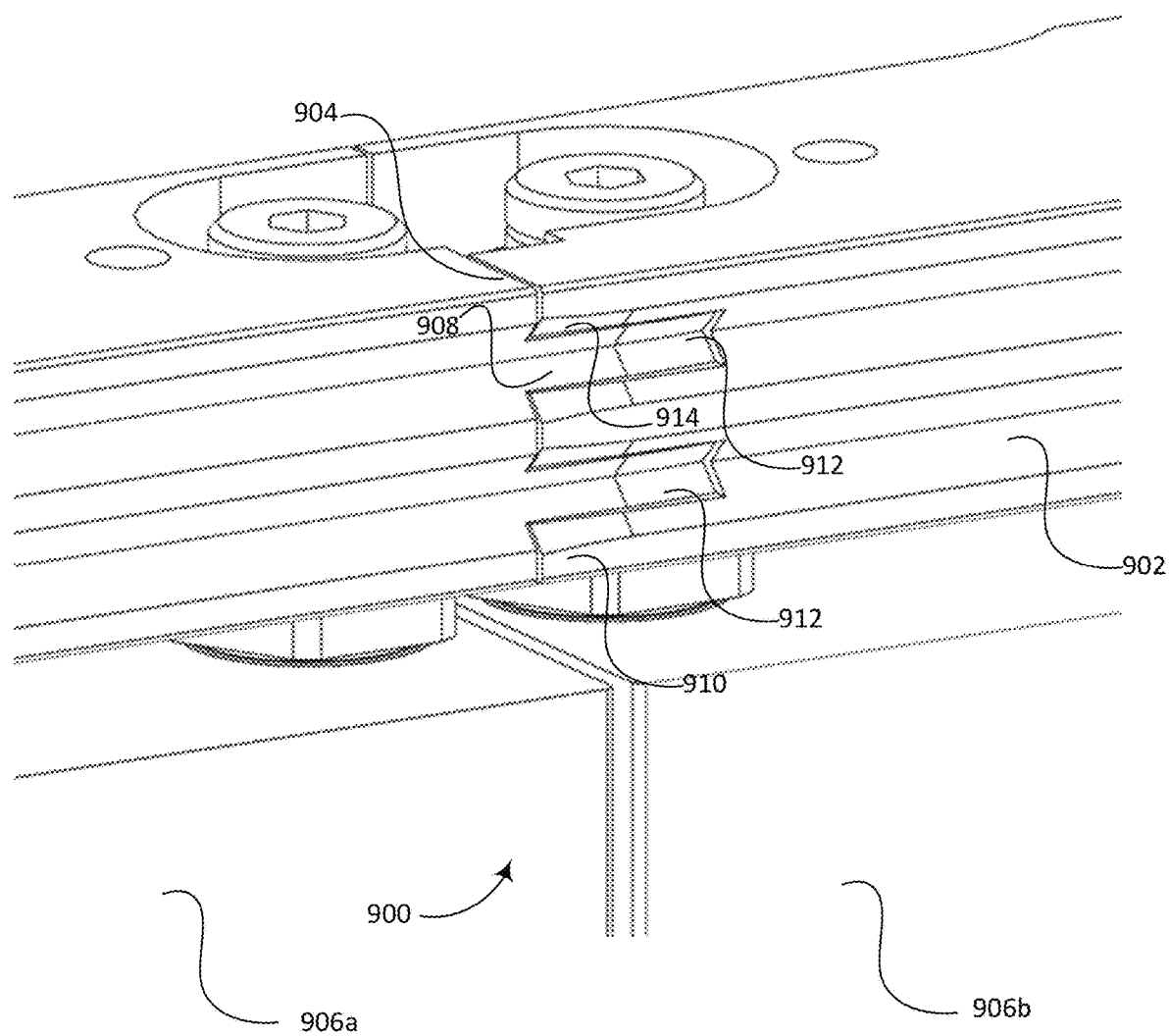
FIG. 14 shows a close up view of an embodiment of a connection between two track sections related to shaped rails.

FIG. 14 illustrates an example embodiment of a system 900 for a track section joint 904 for a shaped guide rail 902. The shaped guide rail 902 is intended to contact a bearing on more than one contact surface. A first track section 906*a* is intended to include at least one protrusion 908 per shaped groove, which is cooperatively received by at least one protrusion 910 per groove on a second track section 906*b*. The at least one protrusion 908, 910 on each of the first and second track sections 906*a*, 906*b* each include an angled section 912, 914 and each angled section 912, 914 is intended to angle or taper inward. In some cases, the angle or taper of the protrusion is determined in three dimensions, such that as the bearing travels on the shaped guide rail and over the joint 904, at least a portion of the bearing remains in contact with at least one guide rail section in one or more planes. In some cases, the protrusion is intended to taper away in a direction normal to the surface of the guide rail. In other cases, the at least one protrusion may taper more in one direction over another based on any expected misalignment of the joint.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. Further, it will be understood that various elements/aspects of each embodiment described herein may be used with other embodiments as appropriate and that each embodiment may include a sub-set of the elements/aspects described therewith.

The above-described embodiments are intended to be examples only. Alterations, modifications and variations can be effected to the particular embodiments by those of skill in the art without departing from the scope, which is defined solely by the claims appended hereto.

What is claimed is:

1. A joint system for managing alignment tolerances in a track section of a conveyor, the system comprising:
   a plurality of track sections, each track section comprising at least one end to be joined with an adjacent track section and one or more rails comprising a running surface on which bearings of moving elements move; and
   wherein, at the end of each track section, the one or more rails each comprise at least one finger such that rails from adjacent track sections form an interlaced connection between fingers from each track section and the fingers comprise an angled portion angled inward relative to the running surface at a predetermined angle and configured such that the bearings transition from one track section to another on the angled portion of the fingers and a non-alignment of the rails within a predetermined alignment tolerance will not jar a bearing moving over the joint.

2. The joint system of claim 1 wherein the fingers are angled inward relative to the running surface at the predetermined angle to allow for the predetermined alignment tolerance.

3. The joint system of claim 1 wherein the at least one finger is configured such that, when adjacent track sections are assembled, primary running surfaces of the bearings run along the fingers from the adjacent track sections.

4. The joint system of claim 1 wherein the size and predetermined angle of the at least one finger is determined based on a planned speed of the conveyor and the planned bearing diameter and/or width.

5. The joint system of claim 1, wherein the at least one finger comprises a plurality of fingers each configured to interlace with a corresponding finger or plurality of fingers on an adjacent track section.

6. The joint system of claim 1, wherein the one or more rails comprise a v-shaped rail and the v-shaped rail is configured such that the predetermined angle for the at least one finger is determined in three dimensions.

7. The joint system of claim 1, wherein the predetermined angle is provided to a portion of the at least one finger.

8. The joint system of claim 1, wherein the predetermined angle is non-linear and comprises a curve.

9. The joint system of claim 1 wherein the fingers make up substantially all of the running surface of the one or more rails.

10. A joint system for managing alignment tolerances in a track section of a conveyor, the system comprising:
a plurality of track sections, each track section comprising at least one end to be joined with an adjacent track section and one or more rails comprising a running surface on which bearings of moving elements move; and
wherein, at the end of each track section, the rails comprise a tongue and groove connector such that rails from adjacent track sections form an interlaced connection with a tongue on one track section fitting into a groove on an adjacent track section, and
wherein at least the running surface where the bearings contact the tongue and groove is each configured with a slope portion sloped inward relative to the running surface towards the other at a predetermined slope and configured such that the bearings transition from one track section to another on the sloped portions and a non-alignment of the rails within a predetermined alignment tolerance will not impact movement of a bearing surface over the joint.

11. The joint system of claim 10 wherein the predetermined slope is determined to allow for when the predetermined alignment tolerance is 100 microns or less, 50 microns or less, 40 microns or less, or 25 microns or less.

12. The joint system of claim 10 wherein the predetermined slope is determined based on the alignment tolerance, the planned speed of the conveyor and the planned diameter of the bearings.

13. The joint system of claim 10, wherein the tongue comprises a plurality of tongues and the groove comprises a plurality of grooves each configured to interlace with corresponding plurality of tongues or grooves on an adjacent track section.

14. The joint system of claim 10, wherein the one or more rails comprise a v-shaped rail and the v-shaped rail is configured such that the slope for the tongue and groove connector is determined in three dimensions.

15. The joint system of claim 10, wherein the predetermined slope is provided to a portion of the tongue or groove.

16. The joint system of claim 10, wherein the predetermined slope is non-linear.

17. A method for manufacturing track sections of a conveyor having an alignment tolerance, the method comprising:
forming a finger at an end of a rail of each track section, wherein each rail comprises a running surface on which bearings run;
angling each finger inward relative to the running surface such that, when adjacent track sections are assembled, primary running surfaces of the bearings run along the fingers from the adjacent track sections such that the bearings transition from one track section to another on the fingers and a non-alignment of the rails within a predetermined alignment tolerance will not jar movement of a bearing over the joint.

18. A joint system for managing alignment tolerances in a track section of a conveyor, the system comprising:
a plurality of track sections, each track section comprising at least one end to be joined with an adjacent track section and one or more rails comprising a running surface on which bearings of moving elements move; and
wherein, at the end of each track section, the one or more rails comprise a finger or split rail portion such that rails from adjacent track sections form an interlaced connection between finger and split rail portion and both the finger and split rail portion are angled inward relative to the running surface such that the bearings transition from one track section to another on the finger and the split rail portion and a non-alignment of the rails within a predetermined alignment tolerance will not impact movement of a bearing over the joint.

19. The joint system of claim 18 wherein the finger and split rail portion are angled to allow for a predetermined alignment tolerance.

20. The joint system of claim 18 wherein the finger and split rail portion are configured such that, when adjacent track sections are assembled, primary running surfaces of the bearings run only along the finger and split rail portions from the adjacent track sections.

* * * * *